US010263526B2

(12) United States Patent
Sandusky et al.

(10) Patent No.: US 10,263,526 B2
(45) Date of Patent: Apr. 16, 2019

(54) ELECTRICAL CIRCUIT FOR ISOLATED VOLTAGE CONVERSION

(71) Applicant: Smart Prong Technologies, Inc., Irvine, CA (US)

(72) Inventors: Randall L. Sandusky, Divide, CO (US); Neaz E. Farooqi, Colorado Springs, CO (US); Kenson Tamotsu Harada, Laguna Niguel, CA (US)

(73) Assignee: Smart Prong Technologies, Inc., Irvine, CA (US)

( * ) Notice: Subject to any disclaimer, the term of this patent is extended or adjusted under 35 U.S.C. 154(b) by 0 days.

(21) Appl. No.: 15/667,316

(22) Filed: Aug. 2, 2017

(65) Prior Publication Data

US 2018/0041128 A1    Feb. 8, 2018

Related U.S. Application Data

(60) Provisional application No. 62/370,168, filed on Aug. 2, 2016.

(51) Int. Cl.
| | |
|---|---|
| *H02M 3/335* | (2006.01) |
| *H02M 3/24* | (2006.01) |
| *H02M 1/00* | (2006.01) |
| *H02J 3/38* | (2006.01) |
| *H02M 3/07* | (2006.01) |
| *H02M 7/44* | (2006.01) |
| *H02M 7/48* | (2007.01) |
| *H02M 3/28* | (2006.01) |

(52) U.S. Cl.
CPC .............. *H02M 3/24* (2013.01); *H02J 3/385* (2013.01); *H02M 1/00* (2013.01); *H02M 3/07* (2013.01); *H02M 7/44* (2013.01); *H02M 7/48* (2013.01); *H02M 3/285* (2013.01); *H02M 2001/007* (2013.01); *H02M 2001/0009* (2013.01)

(58) Field of Classification Search
CPC ............. H02M 3/33523; H02M 3/285; H02M 2001/007; H02M 3/33561; H02M 3/33553
See application file for complete search history.

(56) References Cited

U.S. PATENT DOCUMENTS

| | | | |
|---|---|---|---|
| 8,854,019 B1 | 10/2014 | Levesque et al. | |
| 8,860,396 B2 | 10/2014 | Giuliano | |
| 2006/0017388 A1* | 1/2006 | Stevenson | ............. H01J 37/321 315/111.51 |
| 2008/0157733 A1 | 7/2008 | Williams | |

(Continued)

*Primary Examiner* — Harry R Behm
(74) *Attorney, Agent, or Firm* — Maschoff Brennan (57) ABSTRACT

A system includes a boost circuit, a capacitive circuit, and a converter circuit. The boost circuit receives a DC signal at a first DC voltage and generates an intermediate AC signal at a first AC voltage based on the DC signal. The capacitive circuit receives the intermediate AC signal at the first AC voltage and generates an isolated AC signal at the first AC voltage based on the intermediate AC signal at the first AC voltage. The converter circuit receives the isolated AC signal at the first AC voltage; generates a first isolated DC signal at a second DC voltage based on the isolated AC signal at the first AC voltage; and generates a second isolated DC signal at a third DC voltage based on the first isolated DC signal at the second DC voltage. The third DC voltage may be less than the second DC voltage.

17 Claims, 3 Drawing Sheets

(56) References Cited

U.S. PATENT DOCUMENTS

| | | | |
|---|---|---|---|
| 2011/0157929 A1* | 6/2011 | Sun | H02M 5/00 |
| | | | 363/37 |
| 2012/0087159 A1 | 4/2012 | Chapman et al. | |
| 2012/0113702 A1* | 5/2012 | Rigbers | H02M 3/335 |
| | | | 363/132 |
| 2015/0070949 A1* | 3/2015 | Mukhopadhyay | H02J 50/05 |
| | | | 363/48 |
| 2015/0280455 A1* | 10/2015 | Bosshard | H02J 5/005 |
| | | | 307/104 |
| 2017/0033694 A1* | 2/2017 | Tseng | H02M 3/33507 |

\* cited by examiner

ELECTRICAL CIRCUIT FOR ISOLATED VOLTAGE CONVERSION

CROSS-REFERENCE TO RELATED APPLICATION

This patent application claims benefit of and priority to U.S. Provisional App. No. 62/370,168 filed Aug. 2, 2016, which is incorporated herein by reference in its entirety

FIELD

The embodiments discussed in the present disclosure are related to isolated voltage conversion within an electronic device.

BACKGROUND

The use of electronic devices is a useful tool for work, personal, and entertainment uses. Despite the proliferation of electronic devices, there still remains various limitations for delivering power to electronic devices.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a system for isolated voltage conversion. The system may include a boost circuit, a capacitive circuit, and a converter circuit. The boost circuit may receive a direct current (DC) signal at a first DC voltage. The boost circuit may also generate an intermediate alternating current (AC) signal at a first AC voltage based on the DC signal at the first DC voltage. The capacitive circuit may be electrically coupled to the boost circuit and may receive the intermediate AC signal at the first AC voltage. The capacitive circuit may also generate an isolated AC signal at the first AC voltage based on the intermediate AC signal at the first AC voltage. The converter circuit may be electrically coupled to the capacitive circuit and may receive the isolated AC signal at the first AC voltage. The converter circuit may also generate a first isolated DC signal at a second DC voltage based on the isolated AC signal at the first AC voltage. The converter circuit may additionally generate a second isolated DC signal at a third DC voltage based on the first isolated DC signal at the second DC voltage. The third DC voltage may be less than the second DC voltage.

One or more embodiments of the present disclosure may include a method of isolated voltage conversion. The method may include receiving a DC signal at a first DC voltage. The method may also include generating an intermediate AC signal at a first AC voltage based on the DC signal at the first DC voltage. The method may additionally include generating an isolated AC signal at the first AC voltage. The method may include generating a first isolated DC signal at a second DC voltage based on the isolated AC signal at the first AC voltage. The method may also include generating a second isolated DC signal at a third DC voltage based on the first isolated DC signal at the second DC voltage. The third DC voltage may be less than the second DC voltage.

One or more embodiments of the present disclosure may include a system for isolated voltage conversion. The system may include a boost circuit, a capacitive circuit, a converter circuit, and a current determination circuit. The boost circuit may receive a DC signal at a first DC voltage. The boost circuit may also generate an intermediate AC signal at a first AC voltage based on the DC signal at the first DC voltage. The capacitive circuit may be electrically coupled to the boost circuit and may receive the intermediate AC signal at the first AC voltage. The capacitive circuit may also generate an isolated AC signal at the first AC voltage based on the intermediate AC signal at the first AC voltage. The converter circuit may be electrically coupled to the capacitive circuit and may include an AC/DC converter and a voltage conversion circuit. The AC/DC converter may be electrically coupled to the capacitive circuit and may receive the isolated AC signal at the first AC voltage. The AC/DC converter may also generate a first isolated DC signal at a second DC voltage based on the isolated AC signal at the first AC voltage. The voltage conversion circuit may be electrically coupled to the AC/DC converter and may receive the first isolated DC signal at the second DC voltage. The AC/DC converter may also generate a second isolated DC signal at a third DC voltage based on the first isolated DC signal at the second DC voltage. The third DC voltage may be less than the second DC voltage. The current determination circuit may be electrically coupled to the converter circuit and may receive the second isolated DC signal at the third DC voltage. The current determination circuit may also generate a third isolated DC signal at a fourth DC voltage based on the second isolated DC signal. The current determination circuit may additionally determine a current of the third isolated DC signal. The current determination circuit may generate an isolated control signal based on the determined current of the second isolated DC signal.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Some embodiments of the present disclosure relate to improvements to isolating voltage conversion within an electronic device. For example, a voltage conversion circuit may receive an alternating current (AC) electrical signal at an AC voltage from an AC source and may convert the AC electrical signal so as to output a direct current (DC) electrical signal at a DC voltage. The voltage conversion circuit may include multiple stages that perform inversion and/or conversion of the electrical signal so as to convert the AC electrical signal to the DC electrical signal in a more efficient manner. For example, a stage of the voltage conversion circuit may include a rectifier which may convert the AC electrical signal to an intermediate DC electrical signal. As another example, another stage of the voltage conversion circuit may include a DC/AC converter which may invert the intermediate DC electrical signal to an intermediate AC electrical signal. In some embodiments, a voltage of the intermediate AC electrical signal may be between the voltage of the AC electrical signal and substantially two thousand volts.

In some embodiments, the voltage conversion circuit may include an isolation circuit that may receive the intermediate AC electrical signal and may generate an isolated AC electrical signal that is isolated from the AC source and the DC/AC converter. In these and other embodiments, the isolation circuit may isolate downstream components from the AC source and the DC/AC converter through implementation of capacitors and/or inductors electrically coupled inline between the upstream and downstream components.

In some embodiments, an AC/DC converter may be isolated from the AC source and the DC/AC converter and may receive the isolated AC electrical signal. Additionally or alternatively, the AC/DC converter may generate an isolated DC signal based on the isolated AC electrical signal. In some embodiments, a voltage converter circuit may be isolated from the AC source and the DC/AC converter and may receive the isolated DC electrical signal. In these and other embodiments, the voltage converter circuit may convert the isolated DC electrical signal to an intermediate isolated DC electrical signal.

In some embodiments, a current sensor/regulator circuit may be isolated from the AC source and the DC/AC converter and may receive the intermediate isolated DC electrical signal. In these and other embodiments, the current sensor/regulator circuit may convert the intermediate isolated DC electrical signal to an output isolated DC electrical signal. Additionally or alternatively, the current sensor/regulator circuit may determine a current of the output isolated DC electrical signal and may transmit the current of the output isolated DC electrical signal to control circuits.

In some embodiments, the control circuits may include an isolated control circuit and a non-isolated control circuit. The control circuits may generate a non-isolated control signal and may provide the non-isolated control signal to the DC/AC converter. In these and other embodiments, a duty cycle of components within the DC/AC converter may be adjusted based on the non-isolated control signal. Additionally or alternatively, the DC/AC converter may modify the voltage of the intermediate AC electrical signal based on the adjusted duty cycle of the internal components of the DC/AC converter.

In some embodiments, modifying the voltage of the intermediate AC electrical signal may cause the voltage of the output isolated DC electrical signal to change. Additionally, the DC/AC converter may perform frequency modulation of the intermediate AC electrical signal based on the non-isolated control signal. For example, the frequency of the intermediate AC electrical signal may be modified to be equal to or greater than 500 Hz. In these and other embodiments, adjusting the voltage of the intermediate AC electrical signal may cause $V_{OUT}$ to be adjusted accordingly. Likewise, adjusting the frequency of the intermediate AC electrical signal may modify a current of intermediate AC electrical signal. For example, if the frequency of the intermediate AC electrical signal increases the current of the intermediate AC electrical signal may also increase.

In some embodiment, implementing isolation of voltage conversion through the use of capacitors and/or inductors may eliminate the need for large components. Additionally, a step down/isolation transformer may no longer be necessary, which may also reduce the circuit footprint of the system.

Embodiments of the present disclosure are explained with reference to the accompanying drawings.

Figure 1:
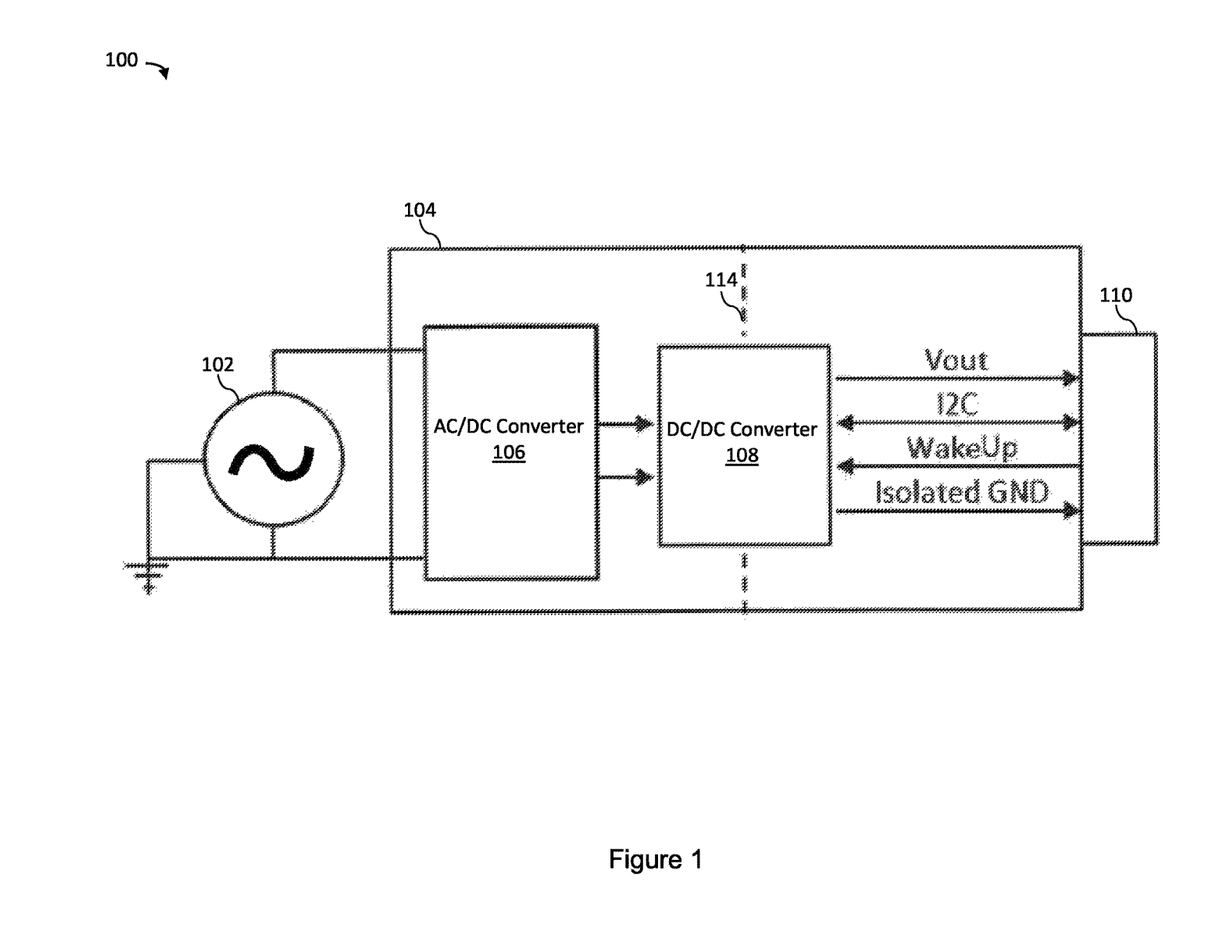
FIG. 1 illustrates an example system of electrical components implementing isolated voltage conversion.

FIG. 1 illustrates an example system 100 of electrical components isolating voltage conversion, in accordance with one or more embodiments of the present disclosure. The system 100 may include an alternating current (AC) source 102, a voltage inverter 104, and a connector 110.

In some embodiments, the system 100 may implement a voltage conversion circuit configured to receive an AC electrical signal at voltage $V_{ACIN}$ from the AC source 102 and may invert and output a direct current (DC) electrical signal at voltage $V_{OUT}$ to an electronic device electrically coupled to the connector 110.

In some embodiments, the AC electrical signal from the AC source 102 may include an AC electrical signal from AC mains such as a power grid. In these and other embodiments, $V_{ACIN}$ may include a voltage between ninety volts AC (VAC) and two hundred sixty four VAC. Additionally or alternatively, $V_{ACIN}$ may include a voltage greater than two hundred sixty four VAC or less than ninety VAC. In some embodiments, the AC source 102 may be grounded to an earth ground.

In some embodiments, the voltage inverter 104 may include an AC/DC converter 106, a DC/DC converter 108, and an isolation barrier 114. In these and other embodiments, the AC/DC converter 106 may be electrically coupled to the AC source 102 may receive the AC electrical signal at $V_{ACIN}$. In these and other embodiments, the AC/DC converter 106 may convert the AC electrical signal to an intermediate DC signal at $V_{INT1}$ based on $V_{ACIN}$ of the AC electrical signal. Additionally or alternatively, the AC/DC converter 106 may provide a voltage boost at a particular rate (for example, a voltage boost of 1×, 1.4×, 2× etc.). For example, if the voltage boost is 1.4× and $V_{ACIN}$ is eighty five VAC then $V_{INT1}$ may be one hundred nineteen volts DC (VDC).

In some embodiments, the DC/DC converter 108 may be electrically coupled to the AC/DC converter 106 in series and may receive the intermediate DC signal at $V_{INT1}$. In these and other embodiments, the DC/DC converter 108 may generate an output DC signal at $V_{OUT}$ based on $V_{INT1}$. Additionally or alternatively, the DC/DC converter 108 may include internal components that convert the intermediate DC electrical signal to an AC electrical signal and/or a different DC electrical signal within the DC/DC converter 108, which are discussed in more detail below. In some embodiments, $V_{OUT}$ may be configurable for implementation with a variety of electronic devices.

In some embodiments, the isolation barrier 114 may represent an isolation plane within the DC/DC converter 108. In these and other embodiments, the isolation barrier 114 may correspond with a power isolation circuit and/or a communication isolation circuit, which are discussed in more detail below. Additionally or alternatively, the isolation barrier 114 may indicated where electrical isolation begins and/or ends within the voltage inverter 104.

In some embodiments, as a result of the isolation barrier 114 being created, the electronic device electrically coupled to the connector 110 and various components within the voltage inverter 104 may be electrically isolated from the AC source 102. In these and other embodiments, the electronic device and the various components within the voltage inverter 104 may be electrically isolated through implementation of capacitive circuits, inductor circuits, and/or multiple ground planes, which are discussed in more detail below. For example, the electronic device and the various components within the voltage inverter 104 may be electrically coupled to an isolated ground plane. Likewise, the AC source and other components within the voltage inverter 104 may be electrically coupled to an earth ground plane.

In some embodiments, the connector 110 may be employed to electrically couple the DC/DC converter 108 to the electronic device. In these and other embodiments, the electronic device may be a device that uses a low power DC electrical signal. For example, the electronic device may be a smart phone, a computer, a laptop, a television, or any other suitable electronic device.

In some embodiments, the DC/DC converter 108 may include internal control components which perform internal control of the DC/DC converter 108, which are discussed in more detail below. In these and other embodiments, the internal control components may be used to maintain efficient regulation of the inversion of the AC electrical signal at $V_{ACIN}$ to the DC electrical signal at $V_{OUT}$. Additionally or alternatively, internal control of the DC/DC converter 108 may be implemented using a variable pulse driver. In some embodiments, internal control of the DC/DC converter 108 may be implemented using an embedded microcontroller and/or a state machine. In these and other embodiments, the internal control of the DC/DC converter 108 may be implemented using analog and/or digital control signals.

In some embodiments, the DC/DC converter 108 may include a memory device to store data related to a history of voltage conversion performed by the voltage inverter 104. For example, the memory device may be used to store information indicating a most recent voltage level of the intermediate DC electrical signal. Likewise, the memory device may store and allow access to country codes that indicate what VAC typically is at a local power grid. In these and other embodiments, the country code may be selected through an inter integrated circuit (I²C) protocol interface. Additionally or alternatively, the voltage of $V_{OUT}$ may be variably selected through the I²C protocol interface. For example, the voltage of $V_{OUT}$ may be selected so as to provide appropriate power to the electronic device. In some embodiments, the voltage of $V_{OUT}$ may be between 0.1 VDC and fifty VDC.

In some embodiments, the DC/DC converter 108 may include control features such that the system 100 complies with safety and hazard standards. For example, the DC/DC converter 108 may include control features such that safety and hazard standards UL/IEC 60950 and 62368 are complied with.

Modifications, additions, or omissions may be made to FIG. 1 without departing from the scope of the present disclosure. For example, while illustrated as including a single AC source 102, the system 100 may include any number of AC sources 102, such as two AC sources 102 or five AC sources 102. As another example, while illustrated as including a single voltage inverter 104, the system 100 may include any number of voltage inverters 104, such as three voltage inverters 104, four voltage inverters 104, or seven voltage inverters 104. As an additional example, while the voltage inverter 104 is illustrated as including a single AC/DC converter 106 and a single DC/DC converter 108, the voltage inverter 104 may include any number of AC/DC converters 106 and DC/DC converters 108, such as two AC/DC converters 106 and DC/DC converters 108. Additionally, while illustrated as including a single connector 110, the system 100 may include any number of connectors 110, such as two connectors 110, three connectors 110, or ten connectors 110.

Figure 2:
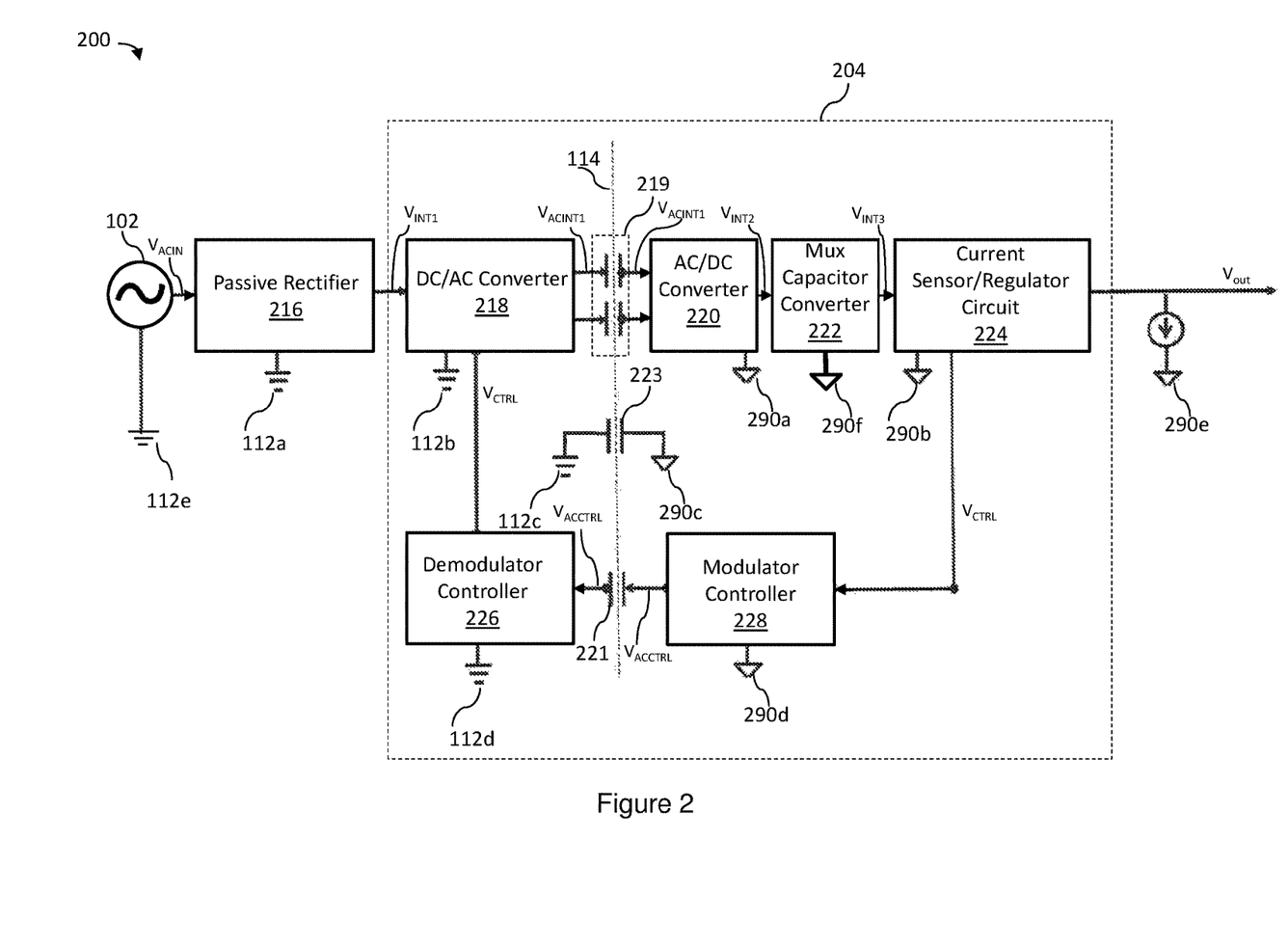
FIG. 2 illustrates another example system of electrical components implementing isolated voltage conversion.

FIG. 2 illustrates another example system 200 of electrical components isolating voltage conversion, in accordance with one or more embodiments of the present disclosure. The system 200 may include an AC source 102, a passive rectifier 216, and a voltage converter 204. The AC source 102 may be the same or similar to the AC source 102 in the system 100 discussed in conjunction with FIG. 1. The AC source 102 may provide an AC electrical signal at $V_{ACIN}$ and may be electrically coupled to earth ground 112e.

In some embodiments, the passive rectifier 216 may be the same or similar to the AC/DC converter 106 discussed in conjunction with FIG. 1. In these and other embodiments, the passive rectifier 216 may be electrically coupled to the AC source 102 and may receive the AC electrical signal at $V_{ACIN}$ from the AC source 102. Additionally or alternatively, the passive rectifier 216 may convert the AC electrical signal to an intermediate DC electrical signal at $V_{IN}$ based on $V_{ACIN}$. Likewise, the passive rectifier 216 may be electrically coupled to earth ground 112a.

In some embodiments, the voltage converter 204 may provide high power factor correction from a high percentage of continuous energy transfer. Additionally or alternatively, the voltage converter 204 may include a DC/AC converter 218, a power isolation circuit 219, an AC/DC converter 220, a MuxCapacitor converter 222, a current sensor/regulator circuit 224, a modulator controller 228, a communication isolation circuit 221, a demodulator controller 226, and a bleed controller 223.

In some embodiments, the DC/AC converter 218 may be electrically coupled to the passive rectifier 216 and may receive the intermediate DC electrical signal at $V_{IN}$. In these and other embodiments, the DC/AC converter 218 may also receive a non-isolated DC control signal. Additionally or alternatively, the DC/AC converter 218 may generate an intermediate AC electrical signal at $V_{ACINT1}$ based on $V_{INT1}$ of the intermediate DC electrical signal and the non-isolated DC control signal. In some embodiments, the voltage of $V_{ACINT1}$ may be equal to or greater than $V_{INT1}$. For example, if the voltage of $V_{INT1}$ is equal to 120 VAC the voltage of $V_{ACINT1}$ may be equal to 120 VAC or more (e.g., 200 VAC, 400 VAC, or 2000 VAC).

In some embodiments, the non-isolated DC control signal may modify a duty cycle of components within the DC/AC converter 218. In these and other embodiments, modifying the duty cycle of components within the DC/AC converter 218 may adjust the voltage of $V_{ACINT1}$. For example, the non-isolated DC control signal may increase the duty cycle of components within the DC/AC converter 218 which may increase the voltage of $V_{ACINT1}$. Additionally or alternatively, the DC/AC converter 218 may perform frequency modulation of the intermediate AC electrical signal to modify a frequency of the intermediate AC electrical signal. In some embodiments, the DC/AC converter 218 may include a pulse driver and may operate in a regulated state through the use of the non-isolated DC control signal. Additionally, the DC/AC converter 218 may be electrically coupled to the earth ground 112b.

In some embodiments, the power isolation circuit 219 may be electrically coupled in series with the DC/AC converter 218 and may receive the intermediate AC electrical signal at $V_{ACINT1}$. In these and other embodiments, the power isolation circuit 219 may generate an isolated AC electrical signal at $V_{ACINT1}$ based on the intermediate AC electrical signal at $V_{ACINT1}$. Additionally or alternatively, the power isolation circuit 219 may provide isolation along a power transfer route within the system 200. Likewise, the power isolation circuit 219 may act as an isolation barrier 114 to isolate downstream components from upstream components. In some embodiments, the power isolation circuit 219 may include one or more capacitors electrically coupled inline to one or more leads out of the DC/AC converter 218. In these and other embodiments, the power isolation circuit 219 may include one or more inductors electrically coupled in series with the one or more capacitors.

In some embodiments, the AC/DC converter 220 may be electrically coupled to the power isolation circuit 219 and may receive the isolated AC electrical signal at $V_{ACINT1}$. In these and other embodiments, the AC/DC converter 220 may generate an isolated DC electrical signal at $V_{INT2}$ based on $V_{ACINT1}$. Additionally or alternatively, the AC/DC converter 220 may be electrically coupled to isolated ground 290a.

In some embodiments, the MuxCapacitor converter 222 may be electrically coupled in series with the AC/DC converter 220 and may receive the isolated DC electrical signal at $V_{INT2}$. In these and other embodiments, the Mux-Capacitor converter 222 may generate an intermediate DC electrical signal at $V_{INT3}$. Additionally or alternatively, the voltage of $V_{INT3}$ may be less than the voltage of $V_{INT2}$. In some embodiments, the voltage of $V_{INT3}$ may be equal to or greater than the voltage of $V_{INT2}$. In these and other embodiments, the MuxCapacitor converter 222 may provide voltage conversion at rate equal to or greater than ninety percent.

In some embodiments, the current sensor/regulator circuit 224 may be electrically coupled to the MuxCapacitor converter 222 and may receive the intermediate DC signal at $V_{INT3}$. In these and other embodiments, the current sensor/regulator circuit 224 may generate an output DC electrical signal at $V_{OUT}$ based on $V_{INT3}$. Additionally or alternatively, the voltage of $V_{OUT}$ may be less than the voltage of $V_{INT3}$. In some embodiments, the voltage of $V_{OUT}$ may be equal to or greater than the voltage of $V_{INT3}$. In these and other embodiments, the output DC electrical signal at $V_{OUT}$ may be provided to an electronic device. Additionally or alternatively, the current sensor/regulator circuit 224 may include a rectifier, an inductor, and/or a capacitor. Likewise, the current sensor/regulator circuit 224 may be electrically coupled to isolated ground 290b.

In some embodiments, the current sensor/regulator circuit 224 may determine a current of the output DC electrical signal when the voltage converter 204 is electrically coupled to an electronic device. In these and other embodiments, the current sensor/regulator circuit 224 may generate an isolated DC control signal at $V_{CTRL}$. Additionally or alternatively, the voltage of $V_{CTRL}$ may be based on the determined current of the output DC electrical signal.

In some embodiments, the modulator controller 228 may be electrically coupled to the current sensor/regulator circuit 224 and may receive the isolated DC control signal at $V_{CTRL}$. In these and other embodiments, the modulator controller 228 may generate an isolated AC control signal at $V_{ACCTRL}$ based on $V_{CTRL}$. Additionally or alternatively, the modulator controller 228 may be electrically coupled to isolated ground 290d.

In some embodiments, the communication isolation circuit 221 may be electrically coupled to the modulator controller 228 and may receive the isolated AC control signal at $V_{ACCTRL}$. In these and other embodiments, the communication isolation circuit 221 may generate a non-isolated AC control signal at $V_{ACCTRL}$. Additionally or alternatively, the communication isolation circuit 221 may include a capacitor, an inductor, or both.

In some embodiments, the demodulator controller 226 may be electrically coupled to the communication isolation circuit 221 and may receive the non-isolated AC control signal at $V_{ACCTRL}$. In these and other embodiments, the demodulator controller 226 may generate the non-isolated DC control signal at $V_{CTRL}$. Additionally or alternatively, the non-isolated DC control signal at $V_{CTRL}$ may be the same or similar to the isolated DC control signal at $V_{CTRL}$. In some embodiments, the demodulator controller 226 may be a passive device that does not modify or adjust an electrical signal beyond converting an AC electrical signal to a DC electrical signal. In these and other embodiments, the demodulator controller 226 may provide the non-isolated DC control signal to the DC/AC converter 218. Additionally or alternatively, the demodulator controller 226 may include a low pass filter which may include a resistor and/or a capacitor.

In some embodiments, the DC/AC converter 218 may adjust the voltage of $V_{ACINT1}$ or the frequency of the intermediate AC electrical signal based on the non-isolated DC electrical signal as discussed above. In these and other embodiments, adjusting the voltage of $V_{ACINT1}$ or the frequency of the intermediate AC electrical signal may cause the voltage of $V_{OUT}$ to also be modified. For example, increasing the voltage of $V_{ACINT1}$ may cause the AC/DC converter 220 to generate the isolated DC electrical signal at a higher voltage of $V_{INT2}$. A higher voltage value of $V_{INT2}$ may cause the MuxCapacitor converter 222 to generate the intermediate DC electrical signal at a higher voltage of $V_{INT3}$. Likewise, a high voltage of $V_{INT3}$ may cause the current sensor/regulator circuit 224 to generate the output DC electrical signal at a higher voltage of $V_{OUT}$.

In some embodiments, the bleed controller 223 may include a capacitor electrically coupled to earth ground 112c and isolated ground 290c. In these and other embodiments, the bleed controller 223 may be used to deplete charge stored on various capacitors within the voltage converter 204. Additionally or alternatively, the bleed controller 223 may be enabled when the AC electrical signal from the AC source 102 is not present. Likewise, the bleed controller 223 may be disabled when the voltage of $V_{IN}$ is equal to or exceeds a threshold value. For example, the threshold value may be equal to or greater than twenty five VDC.

In some embodiments, the earth grounds 112a-e may be electrically isolated from the isolated grounds 290a-f. In these and other embodiments, isolating the earth grounds 112a-e from the isolated grounds 290a-f may improve isolation of the voltage conversion performed by the system 200.

Modifications, additions, or omissions may be made to FIG. 2 without departing from the scope of the present disclosure. For example, while illustrated as including a single AC source 102, the system 200 may include any number of AC sources 102, such as two AC sources 102 or five AC sources 102. As another example, while illustrated as including a single passive rectifier 216, the system 200 may include any number of passive rectifiers 216, such as two passive rectifiers 216 or four passive rectifiers 216. As an additional example, while illustrated as include a single voltage converter 204, the system 200 may include any number of voltage converters 204, such as three voltage converters 204, four voltage converters 204, or seven voltage converters 204. As an additional example, while the voltage converter 204 is illustrated as including a single DC/AC converter 218, a single power isolation circuit 219, a single AC/DC converter 220, a single MuxCapacitor converter 222, a single current sensor/regulator circuit 224, a single modulator controller 228, a single communication isolation circuit 221, a single demodulator controller 226, and a single bleed controller 223, the voltage converter 204 may include any number of DC/AC converters 218, power isolation circuits 219, AC/DC converters 220, MuxCapacitor converters 222, current sensor/regulator circuits 224, modulator controllers 228, communication isolation circuits 221, demodulator controllers 226, or single bleed controllers 223, such as seven of each component, three of each component, or different numbers of each component.

Figure 3:
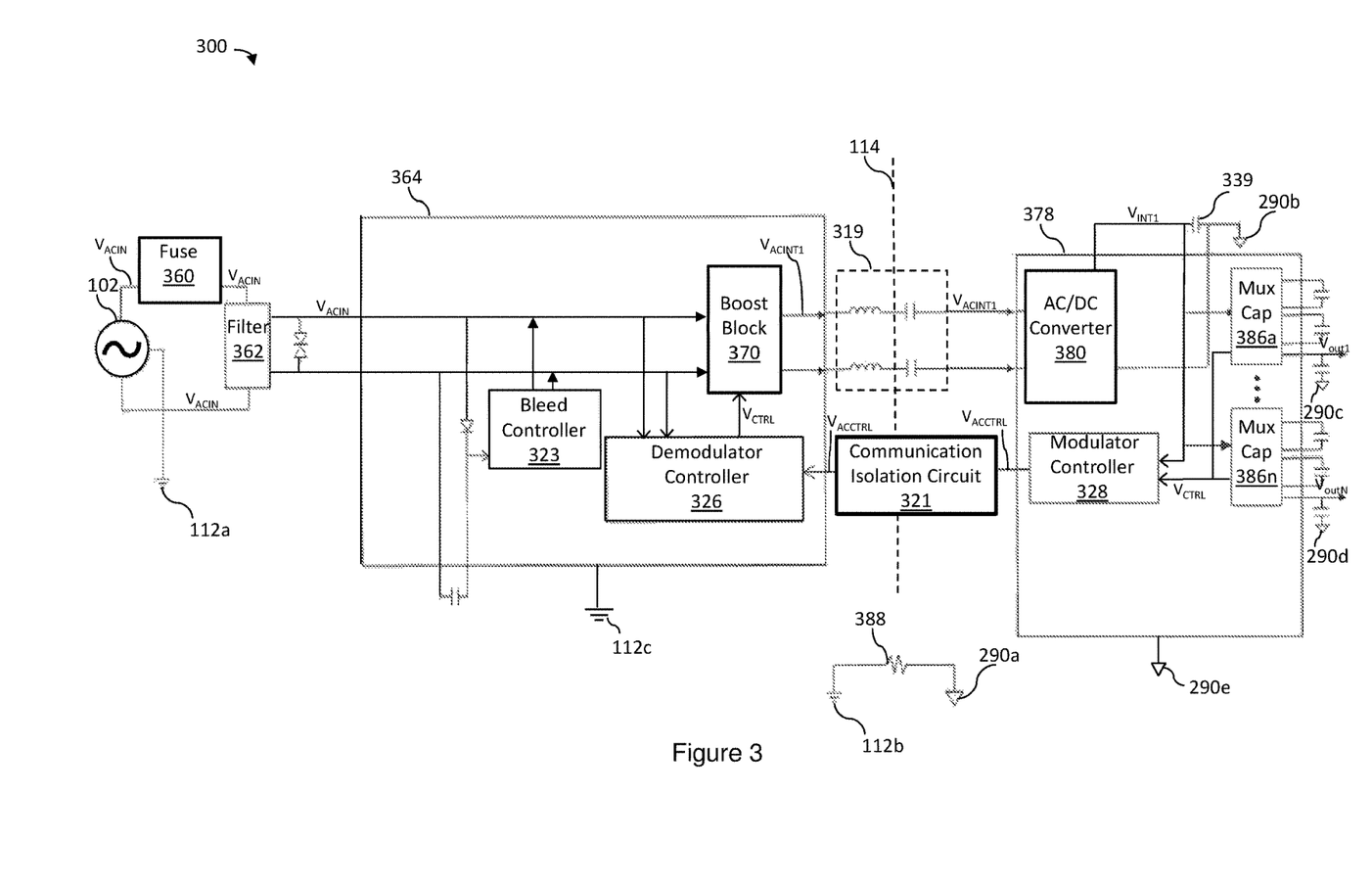
FIG. 3 illustrates an additional example system of electrical components implementing isolated voltage conversion.

FIG. 3 illustrates an additional example system 300 of electrical components implementing isolated voltage conversion, in accordance with one or more embodiments of the present disclosure. The system 300 may include an AC source 102, a fuse 360, a filter 362, a high voltage integrated circuit (IC) 364, a power isolation circuit 319, a low voltage IC 378, a communication isolation circuit 321, and a bleed circuit 388.

In some embodiments, the AC source 102 may be the same or similar to the AC source 102 in the systems 100 and 200 discussed in conjunction with FIGS. 1 and 2. The AC source 102 may provide an AC electrical signal at $V_{ACIN}$ and may be electrically coupled to earth ground 112$a$. In these and other embodiments, the fuse 260 may be electrically coupled to the AC source 102 and may be used to prevent current above a threshold value from being received by the high voltage IC 364 which may damage internal components of the high voltage IC 364. Additionally or alternatively, the filter 362 may be electrically coupled to the fuse 360, the AC source 102, and earth ground 112$a$. In some embodiments, the filter 362 may receive the AC electrical signal at $V_{ACIN}$ and may generate a filtered AC electrical signal at $V_{ACIN}$.

In some embodiments, the high voltage IC 364 may include a boost block 370, a bleed controller 323, and/or a demodulator controller 326. In these and other embodiments, the high voltage IC 364 and the various internal components of the high voltage IC 364 may be electrically coupled to earth ground 112$c$.

In some embodiments, the boost block 370 may be electrically coupled to the filter 362 and may receive the filtered AC electrical signal at $V_{ACIN}$. In these and other embodiments, the boost block 370 may generate an intermediate AC electrical at $V_{ACINT1}$ based on $V_{ACIN}$. Additionally or alternatively, the voltage of the $V_{ACINT1}$ may be equal to or greater than the voltage of $V_{ACIN}$. In some embodiments, the voltage of $V_{ACINT1}$ may be between one hundred twenty VAC and two thousand VAC. In these and other embodiments, the boost block 370 may be used to push and/or pull electrical signal through the power isolation circuit 319. For example, the boost block 370 may be used to push the intermediate AC electrical signal at $V_{ACINT1}$ through the power isolation circuit 319.

In some embodiments, the boost block 370 may include an H-driver which may include an H-Bridge, FETs, and/or gate circuitry. In these and other embodiments, the frequency of the intermediate AC electrical signal may decrease as the AC electrical signal waveform peaks. Additionally or alternatively, the frequency of the intermediate AC electrical signal may increase as the AC electrical signal approaches zero crossing. In some embodiments, the AC electrical signal may be at the zero crossing when an electronic device electrically coupled to the low voltage IC 378 is drawing more power than is available on the AC electrical signal.

In some embodiments, the boost block 370 may receive a non-isolated DC control signal. In these and other embodiments, the non-isolated DC control signal may adjust a duty cycle of internal components of the boost block 370. Additionally or alternatively, adjusting the duty cycle of internal components within the boost block 370 may modify the voltage of $V_{ACINT1}$. In some embodiments, the non-isolated DC electrical signal may also cause the boost block 370 to perform frequency modulation of the intermediate AC electrical signal, which may increase or decrease a frequency of the intermediate AC electrical signal.

In some embodiments, the demodulator controller 326 may receive a non-isolated AC control signal. In these and other embodiments, the non-isolated AC control signal may represent a current of an output DC electrical signal being drawn by the electronic device. Additionally or alternatively, the demodulator controller 326 may include a passive device such as a low pass filter. In some embodiments, the demodulator controller 326 may include a resistor and a capacitor.

In some embodiments, the bleed controller 323 may determine whether the AC electrical signal is present or not. In these and other embodiments, the bleed controller 323 may disable a bleed circuit 388 when the AC electrical signal is present. Additionally or alternatively, the bleed controller 323 may enable the bleed circuit 388 when the AC electrical signal is not present. In some embodiment, the bleed controller 323 may determine whether the AC electrical signal is present by measuring $V_{ACIN}$. In these and other embodiments, the bleed circuit 388 may be electrically coupled to earth ground 112$b$ and isolated ground 290$a$ and may be used to drain charge stored on capacitors or any device located within the high voltage IC 364 and/or the low voltage IC 378. Additionally or alternatively, the bleed circuit 388 may include a resistor electrically coupled to earth ground 112$b$ and isolated ground 290$a$.

In some embodiments, the power isolation circuit 319 may receive the intermediate AC electrical signal at $V_{ACINT1}$. In these and other embodiments, the power isolation circuit 319 may generate an isolated AC electrical signal at $V_{ACINT1}$ based on the intermediate AC electrical signal. Additionally or alternatively, the power isolation circuit may include one or more caps and/or one or more inductors. In some embodiments, the power isolation circuit 319 may act as an isolation barrier (represented by isolation barrier 114) to isolate internal components of the low voltage IC from the high voltage IC and the AC source. In these and other embodiments, the low voltage IC 378 and the electronic device electrically coupled to the low voltage IC may be isolated from the high voltage IC 364, the filter 362, the fuse 360, and the AC source 102.

In some embodiments, the low voltage IC 378 may include an AC/DC converter 380, a modulator controller 328, a capacitive element 339, and one or more MuxCapacitor converters 386$a$-$n$. In these and other embodiments, the low voltage IC 378 and its internal components may be electrically coupled to isolated ground 290$e$.

In some embodiments, the AC/DC converter 380 may be electrically coupled to the power isolation circuit 319 and may receive the isolated AC electrical signal at $V_{ACINT1}$. In these and other embodiments, the AC/DC converter may generate an isolated DC electrical signal at $V_{INT1}$ based on $V_{ACINT1}$. For example, the voltage of $V_{INT1}$ may be forty eight VDC.

In some embodiments, the capacitive element 339 may be electrically coupled to the AC/DC converter 380 and may receive the isolated DC electrical signal at $V_{INT1}$. In these and other embodiments, the capacitive element 339 may store a charge representative of the isolated DC electrical signal at $V_{INT1}$. Additionally or alternatively, the capacitive element 339 may be electrically coupled to the one or more MuxCapacitor converter 386a-n and may provide the stored charge representing the isolated DC electrical signal at $V_{INT1}$ when the AC electrical signal is at the zero crossing so as to help provide sufficient power to the electronic device during the zero crossing.

In some embodiment, the one or more MuxCapacitor converters 386a-n may be electrically coupled to the AC/DC converter 380 and/or the capacitive element 339. In these and other embodiment, each of the MuxCapacitor converters 386a-n may receive the isolated DC electrical signal at $V_{INT1}$ and each MuxCapacitor converter 386a-n may perform different amounts of voltage conversion. For example, a first MuxCapacitor converter 386a may receive the isolated DC electrical signal at $V_{INT1}$ and may generate a first output DC electrical signal at $V_{OUT1}$, which may be less than $V_{INT1}$. As another example, a second MuxCapacitor converter 386b may receive the isolated DC electrical signal at $V_{INT1}$ and may generate a second output DC electrical signal at $V_{OUT2}$, which may be less than $V_{INT1}$ and/or $V_{OUT1}$. For example, the voltage of $V_{OUT1}$ may be twenty four VDC and the voltage of $V_{OUT2}$ may be five VDC. In some embodiments, the MuxCapacitor converters 386a-n may generate an isolated DC control signal at $V_{CTRL}$.

In some embodiments, the MuxCapacitors 386a-n may determine a current of the output DC electrical signals when the low voltage IC 378 is electrically coupled to an electronic device. In these and other embodiments, the MuxCapacitors 386a-n may generate the isolated DC control signal at $V_{CTRL}$. Additionally or alternatively, the voltage of $V_{CTRL}$ may be based on the determined current of the output DC electrical signals.

In some embodiments, the modulator controller 328 may be electrically coupled to the MuxCapacitors 386a-n and may receive the isolated DC control signal at $V_{CTRL}$. In these and other embodiments, the modulator controller 328 may generate an isolated AC control signal at $V_{ACCTRL}$ based on $V_{CTRL}$.

In some embodiments, the communication isolation circuit 321 may be electrically coupled to the modulator controller 328 and may receive the isolated AC control signal at $V_{ACCTRL}$. In these and other embodiments, the communication isolation circuit 321 may generate a non-isolated AC control signal at $V_{ACCTRL}$. Additionally or alternatively, the communication isolation circuit 321 may include a capacitor, an inductor, or both.

In some embodiments, the demodulator controller 326 may be electrically coupled to the communication isolation circuit 321 and may receive the non-isolated AC control signal at $V_{ACCTRL}$. In these and other embodiments, the demodulator controller 326 may generate the non-isolated DC control signal at $V_{CTRL}$. Additionally or alternatively, the non-isolated DC control signal at $V_{CTRL}$ may be the same or similar to the isolated DC control signal at $V_{CTRL}$. In some embodiments, the demodulator controller 326 may be a passive device that does not modify or adjust an electrical signal beyond converting an AC electrical signal to a DC electrical signal. In these and other embodiments, the demodulator controller 326 may provide the non-isolated DC control signal to the boost block 370. Additionally or alternatively, the demodulator controller 226 may include a low pass filter which may include a resistor and/or a capacitor.

In some embodiments, the boost block 370 may adjust the voltage of $V_{ACINT1}$ or the frequency of the intermediate AC electrical signal based on the non-isolated DC electrical signal as discussed above. In these and other embodiments, adjusting the voltage of $V_{ACINT1}$ or the frequency of the intermediate AC electrical signal may cause the voltages $V_{OUT1}$-$V_{OUTN}$ to also be modified. For example, increasing the voltage of $V_{ACINT1}$ may cause the boost block 370 to generate the intermediate AC electrical signal at a higher voltage of $V_{ACINT1}$. A higher voltage value of $V_{ACINT1}$ may cause the AC/DC converters to generate isolated DC electrical signal at a higher voltage of $V_{INT1}$ which may cause the MuxCapacitor converters 386a-n to generate the output DC electrical signals (e.g., $V_{OUT1}$-$V_{OUTN}$) at higher voltages. In some embodiments, controlling $V_{ACINT1}$ to adjust $V_{OUT1}$-$V_{OUTN}$ may permit continuous adaptation of $V_{OUT1}$-$V_{OUTN}$ in response to the AC electrical signal changing.

In some embodiments, the earth grounds 112a-b may be electrically isolated from the isolated grounds 290a-e. In these and other embodiments, isolating the earth grounds 112a-b from the isolated grounds 290a-e may improve isolation of the voltage conversion performed by the system 300.

Modifications, additions, or omissions may be made to FIG. 3 without departing from the scope of the present disclosure. For example, while illustrated as including a single AC source 102, the system 300 may include any number of AC sources 102, such as two AC sources 102 or five AC sources 102. As another example, while illustrated as including a single fuse 360 and a single filter 362, the system 300 may include any number of fuses 360 and/or filters 362, such as two fuses 360 and filters 362 or four fuses and three filters 362. As an additional example, while illustrated as including a single high voltage IC 364, the system 300 may include any number of high voltage ICs 364, such as three high voltage ICs 364, four high voltage ICs 364, or seven high voltage ICs 364. As an additional example, while the high voltage IC 364 is illustrated as include a single boost block 370, a single demodulator controller 326, and a single bleed controller 323, the high voltage IC 364 may include any number of boost blocks 370, demodulator controllers 326, and/or bleed controllers 323. For example, while illustrated as including a single low voltage IC 378, the system 300 may include any number of low voltage ICs 378, such as three low voltage ICs 378, four low voltage ICs 378, or seven low voltage ICs 378. As another example, while illustrated as including a single power isolation circuit 319, communication isolation circuit, and a single bleed circuit 388, the system 300 may include any number of each component.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system, comprising:
   a boost circuit configured to:
      receive a direct current (DC) signal at a first DC voltage; and
      generate an intermediate alternating current (AC) signal at a first AC voltage based on the DC signal at the first DC voltage;
   a capacitive circuit electrically coupled to the boost circuit and configured to:
      receive the intermediate AC signal at the first AC voltage; and
      generate an isolated AC signal at the first AC voltage based on the intermediate AC signal at the first AC voltage;
   a converter circuit electrically coupled to the capacitive circuit and configured to:
      receive the isolated AC signal at the first AC voltage;
      generate a first isolated DC signal at a second DC voltage based on the isolated AC signal at the first AC voltage; and
      generate a second isolated DC signal at a third DC voltage based on the first isolated DC signal at the second DC voltage, wherein the third DC voltage is less than the second DC voltage; and
   a current determination/regulator circuit electrically coupled to the converter circuit and configured to:
      receive the second isolated DC signal at the third DC voltage;
      generate an isolated power DC signal at a fourth DC voltage based on the second isolated DC signal;
      determine a current of the isolated power DC signal; and
      generate an isolated control signal based on the determined current of the isolated power DC signal, wherein the boost circuit is further configured to adjust the intermediate AC signal based on the isolated control signal.

2. The system of claim 1, wherein the capacitive circuit comprises a first capacitive circuit and the isolated control signal comprises a first isolated control signal, the system further comprising:
   a first control circuit electrically coupled to the current determination/regulator circuit and configured to:
      receive the first isolated control signal; and
      generate a second isolated control signal based on the first isolated control signal;
   a second capacitive circuit electrically coupled to the first control circuit and configured to:
      receive the second isolated control signal; and
      generate a first non-isolated control signal based on the second isolated control signal; and
   a second control circuit electrically coupled to the second capacitive circuit and the boost circuit and configured to:
      receive the first non-isolated control signal;
      generate a second non-isolated control signal based on the first non-isolated control signal; and
      transmit the second non-isolated control signal to the boost circuit, wherein the boost circuit is further configured to adjust at least one of the first AC voltage or a frequency of the intermediate AC signal based on the second non-isolated control signal.

3. The system of claim 1, wherein the capacitive circuit comprises an inductor electrically coupled in series with a capacitor.

4. The system of claim 1, wherein the capacitive circuit comprises a plurality of capacitors electrically coupled in parallel between the boost circuit and the converter circuit.

5. The system of claim 1, wherein the boost circuit is further configured to generate the intermediate AC signal between four hundred and substantially two thousands volts.

6. The system of claim 1, wherein the converter circuit comprises:
an AC/DC converter electrically coupled to the capacitive circuit and configured to:
receive the isolated AC signal at the first AC voltage; and
generate the first isolated DC signal at the second DC voltage; and
a voltage conversion circuit electrically coupled to the AC/DC converter and configured to:
receive the first isolated DC signal at the second DC voltage; and
generate the second isolated DC signal at the third DC voltage, wherein the third DC voltage is less than the second DC voltage.

7. The system of claim 1, wherein the boost circuit is electrically coupled to a first ground and the converter circuit is electrically coupled to a second ground, the system further comprising a third capacitive circuit electrically coupled to the first ground and the second ground.

8. The system of claim 1, the system further comprising a rectifier configured to:
receive an AC mains signal at a second AC voltage; and
generate the DC signal at the first DC voltage based on the AC mains signal at the second AC voltage.

9. A method, comprising:
receiving a DC signal at a first DC voltage;
generating an intermediate AC signal at a first AC voltage based on the DC signal at the first DC voltage;
generating an isolated AC signal at the first AC voltage;
generating a first isolated DC signal at a second DC voltage based on the isolated AC signal at the first AC voltage;
generating a second isolated DC signal at a third DC voltage based on the first isolated DC signal at the second DC voltage, wherein the third DC voltage is less than the second DC voltage;
generating an isolated power DC signal at a fourth DC voltage based on the second isolated DC signal;
determining a current of the isolated power DC signal; and
generating an isolated control signal based on the determined current of the isolated power DC signal, wherein the intermediate AC signal is adjusted based on the isolated control signal.

10. The method of claim 9, wherein the isolated control signal comprises a first isolated control signal, the method further comprising:
generating a second isolated control signal based on the first isolated control signal;
generating a first non-isolated control signal based on the second isolated control signal;
generating a second non-isolated control signal based on the first non-isolated control signal; and
adjusting at least one of the first AC voltage or a frequency of the intermediate AC signal based on the second non-isolated control signal.

11. The method of claim 9, wherein generating the intermediate AC signal at the first AC voltage based on the DC signal at the first DC voltage comprises generating the intermediate AC signal between substantially four hundred volts and substantially two thousands volts.

12. The method of claim 9, further comprising isolating the first DC signal and the intermediate AC signal from the isolated AC, first isolated DC signal, and second isolated DC signal through a first ground and a second ground.

13. The method of claim 9, wherein generating the second isolated DC signal at the third DC voltage based on the first isolated DC signal comprises:
generating a first isolated intermediate DC signal at a fifth DC voltage based on the first isolated DC signal at the second DC voltage, wherein the fifth DC voltage is less than the second DC voltage; and
generating the second isolated DC signal at the third DC voltage based on the first isolated intermediate DC signal at the fifth DC voltage.

14. The method of claim 9, the method further comprising:
receiving an AC mains signal at a second AC voltage; and
generating the DC signal at the first DC voltage based on the AC mains signal at the second AC voltage.

15. A system, comprising:
a boost circuit configured to:
receive a DC signal at a first DC voltage; and
generate an intermediate AC signal at a first AC voltage based on the DC signal at the first DC voltage;
a capacitive circuit electrically coupled to the boost circuit and configured to:
receive the intermediate AC signal at the first AC voltage; and
generate an isolated AC signal at the first AC voltage based on the intermediate AC signal at the first AC voltage;
a converter circuit electrically coupled to the capacitive circuit comprising:
an AC/DC converter electrically coupled to the capacitive circuit and configured to:
receive the isolated AC signal at the first AC voltage; and
generate a first isolated DC signal at a second DC voltage based on the isolated AC signal at the first AC voltage;
a voltage conversion circuit electrically coupled to the AC/DC converter and configured to:
receive the first isolated DC signal at the second DC voltage; and
generate a second isolated DC signal at a third DC voltage based on the first isolated DC signal at the second DC voltage, wherein the third DC voltage is less than the second DC voltage; and
a current determination/regulator circuit electrically coupled to the converter circuit and configured to:
receive the second isolated DC signal at the third DC voltage;
generate an isolated power DC signal at a fourth DC voltage based on the second isolated DC signal;
determine a current of the isolated power DC signal; and
generate an isolated control signal based on the determined current of the isolated power DC signal, wherein the boost circuit is further configured to adjust the intermediate AC signal based on the isolated control signal.

16. The system of claim 15, wherein the capacitive circuit comprises a first capacitive circuit and the isolated control signal comprises a first isolated control signal, the system further comprising:
a first control circuit electrically coupled to the current determination/regulator circuit and configured to:
receive the first isolated control signal; and
generate a second isolated control signal based on the first isolated control signal;

a second capacitive circuit electrically coupled to the first control circuit and configured to:
  receive the second isolated control signal; and
  generate a first non-isolated control signal based on the second isolated control signal; and
a second control circuit electrically coupled to the second capacitive circuit and the boost circuit and configured to:
  receive the first non-isolated control signal;
  generate a second non-isolated control signal based on the first non-isolated control signal; and
  transmit the second non-isolated control signal to the boost circuit, wherein the boost circuit is further configured to adjust at least one of the first AC voltage or a frequency of the intermediate AC signal based on the second non-isolated control signal.

17. The system of claim 15, wherein the boost circuit is configured to generate the intermediate AC signal between four hundred volts and two thousands volts.

* * * * *

UNITED STATES PATENT AND TRADEMARK OFFICE
CERTIFICATE OF CORRECTION

PATENT NO. : 10,263,526 B2  
APPLICATION NO. : 15/667316  
DATED : April 16, 2019  
INVENTOR(S) : Sandusky et al.

Page 1 of 1

It is certified that error appears in the above-identified patent and that said Letters Patent is hereby corrected as shown below:

On the Title Page

Item (72), add inventors: --Robert Dieter, Owasso, OK (US); Michael H. Freeman, Tulsa, OK (US); Brian Santee, Tulsa, OK (US); Mitchael C. Freeman, Sapulpa, OK (US)--.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*